July 14, 1942. R. C. MARCEAU 2,289,511
SOLDERING APPARATUS
Original Filed July 15, 1940 2 Sheets-Sheet 2
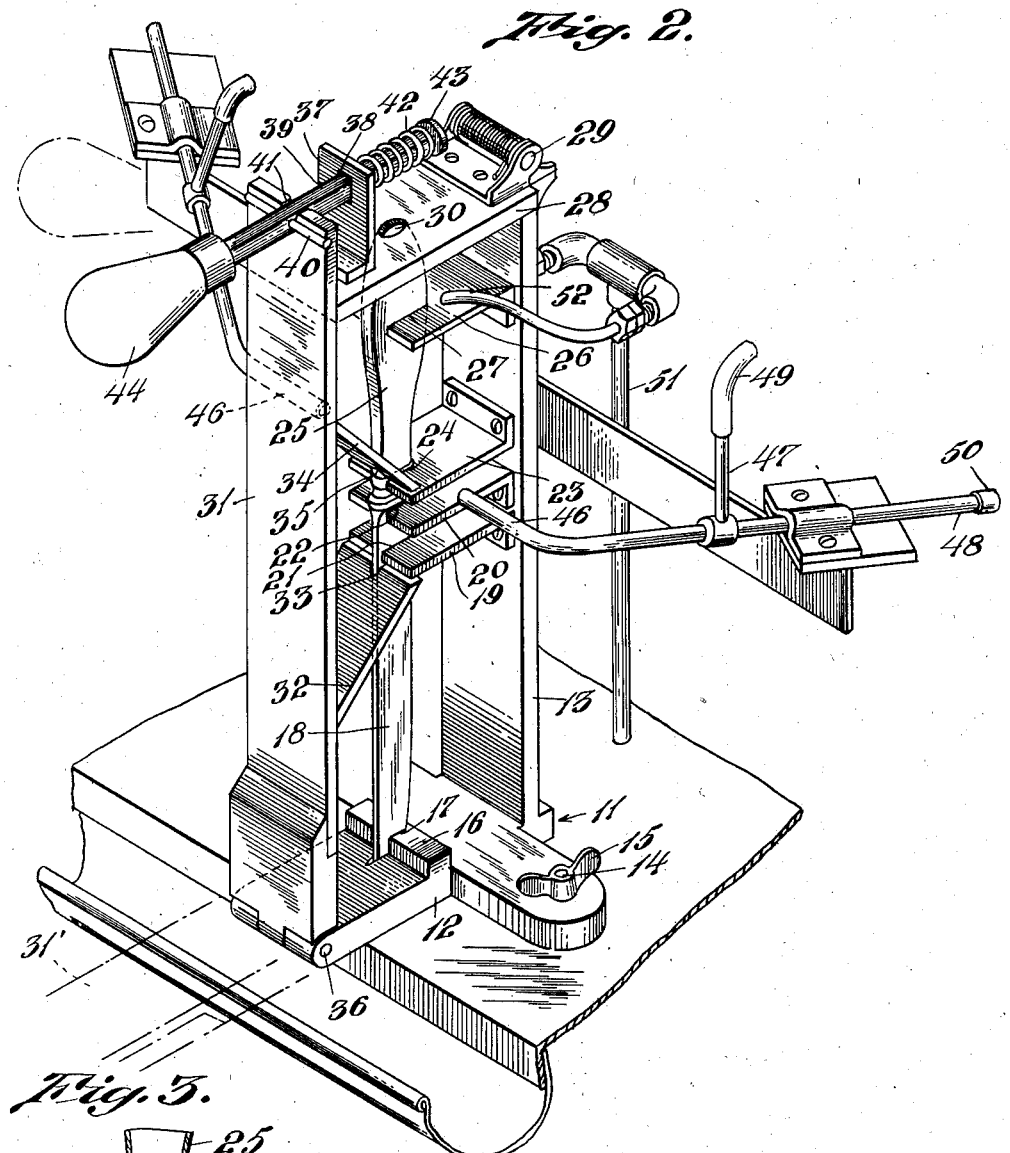
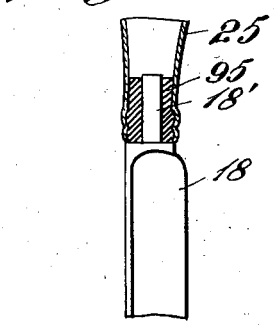
INVENTOR.
Robert C. Marceau
BY Barlow & Barlow
ATTORNEYS.

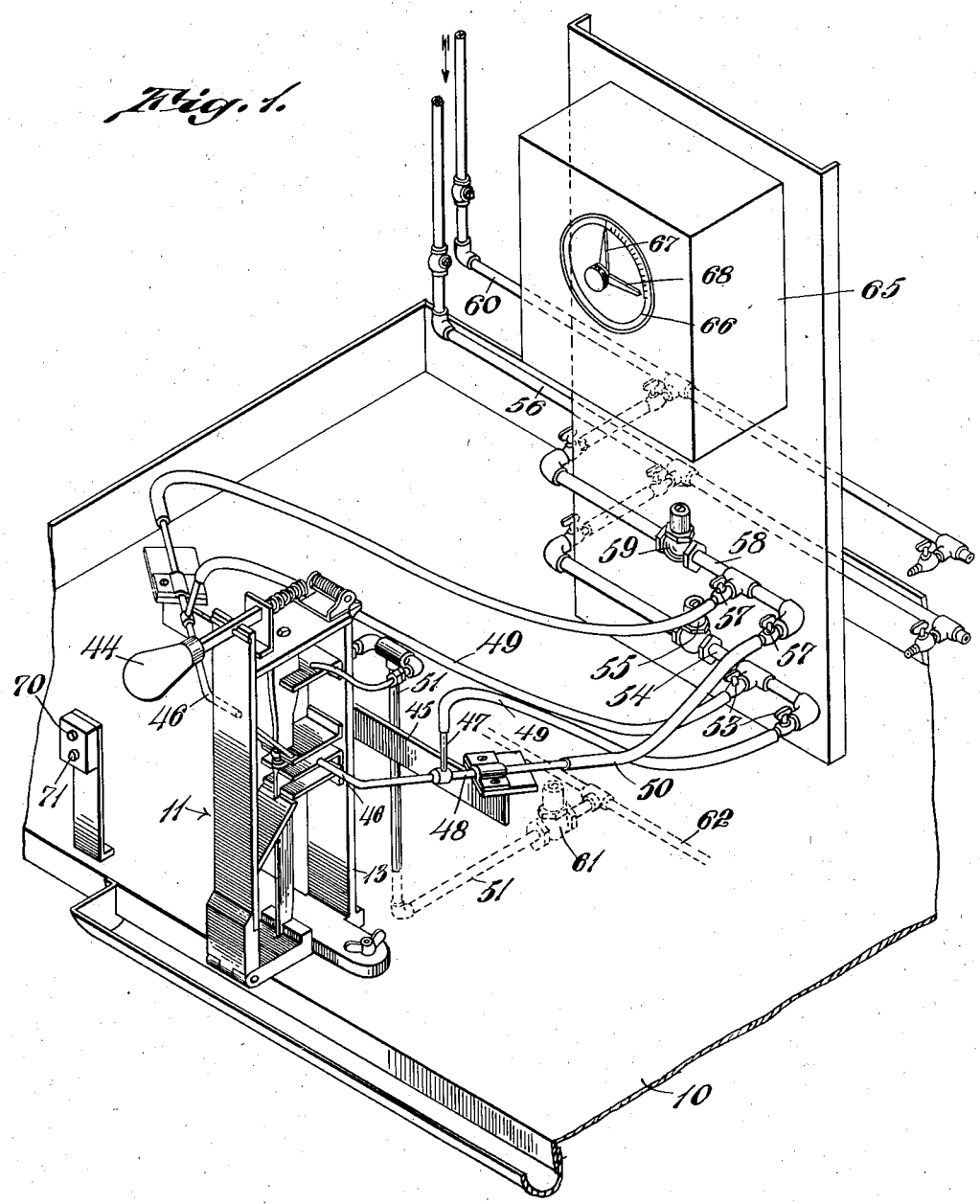

Patented July 14, 1942

2,289,511

UNITED STATES PATENT OFFICE 2,289,511

SOLDERING APPARATUS

Robert Charles Marceau, Riverside, R. I.

Original application July 15, 1940, Serial No. 345,525. Divided and this application January 11, 1941, Serial No. 374,035

2 Claims. (Cl. 113—99)

This application is a division of application Serial No. 345,525, filed July 15, 1940. The invention relates to a soldering apparatus, more particularly for the soldering of flat tableware such, for instance, as soldering of the silver handle to the steel blade of a knife.

The invention has for one of its objects to provide a simple, accurate and convenient mechanism requiring less skilled labor for the performing of a soldering operation of this character.

Another object of the invention is to provide a soldering clamp which may be simply and quickly loaded.

Another object of the invention is to provide a clamp which may be quickly operated.

Another object of the invention is to make automatic and free of manual errors many of the operations in connection with the soldering of two pieces of work together.

With these and other objects in view, the invention consists of certain novel features of construction, as will be more fully described and particularly pointed out in the appended claims.

In the accompanying drawings:

Fig. 1 is a perspective view of a fragmental portion of the table illustrating the unit of the apparatus in the relative positions which they will assume in operation;

Fig. 2 is a perspective view showing on a larger scale the jig for holding the table knife in position for soldering; and Fig. 3 is a sectional view of a fragmental portion of the work.

In high grade flatware it is desirable that the handles be soldered onto the blades of the knives; and to perform this accurately requires skilled labor; or for quicker operation, a complicated machine, which has been found to be unsatisfactory. In order to simplify the soldering apparatus, I have arranged a jig to hold the handle and blade in desired position with blow torches for directing a gas flame to the desired location for the application of heat, and I have also provided means for holding a water conduit for cooling when the heat has performed its function; and the following is a more detailed description of the present embodiment of this invention, illustrating the preferred means by which these advantageous results may be accomplished:

With reference to the drawings, 10 designates a table top or suitable support upon which the apparatus is mounted. At the forward edge of the table adjacent to a position where the operator would be located and convenient for the operator I have provided a jig designated generally 11 and consisting of a body portion having a base 12 and standard 13. The base is provided with a suitable opening through which bolts 14 extend to secure the jig to the table top as by means of wing nuts 15.

A boss 16 is slotted as at 17 for the reception of the end of the blade 18 of the table knife. Arms 19 and 20 notched as at 21 and 22 also receive the upper portion of the blade of the table knife and fix the alignment of the same in position. An arm 23 notched as at 24 receives the end portion of the handle 25 of the table knife, while an arm 26 notched as at 27 receives the larger intermediate portion of the table knife for properly aligning these parts and locating them in relation to the blade.

A top plate 28 is hinged as at 29 to the upright standard 13 and is provided with an opening 30 for the reception of the upper tip end of the handle 25 so as to assist in locating the handle in desired position, while a front plate 31 hinged as at 36 to the base portion 12 for swinging to and from open and closed position is provided with an upwardly inclined arm 32 notched as at 33 and a downwardly inclined arm 34 notched as at 35 for the reception of the handle. These arms afford some resiliency and are located on converging angles so as to well brace the knife blade and handle in position. The base standard 13, top plate and front plate form a frame-like jig as illustrated.

In order to lock these two hinged plates 31 and 28 in position, I have provided an upstanding guide 37 having an opening 38 to suitably guide a bar 39. This is provided with a cross pin 40 and may be received in a notch 41 in the upper end of the plate 31 while a spring 42 abutting the shoulder 43 and the guide tends to move the bar 39 through the opening 38 to pull the pin 40 against the plate 31. Release of this holding may be had by means of pulling on the handle 44 to slide the bar 39 against the tension of the spring 42 to permit the pin to be lifted over the edge of the plate 31.

It will be readily apparent that the plate 31 when released may be swung to the dotted line position indicated at 31', while the plate 28 may then be lifted to free the upper tip of the knife which is located in the opening 30.

Across the rear portion of the upright standard 13, the support bar 45 is secured, and upon this support bar there is suitably mounted the nozzles 46 having a T-shaped inlet 47 and an aligned inlet 48. Gas conduit 49 is connected to the inlet 47 and an air conduit 50 is connected to the inlet 48 so that a blow torch is arranged in conjunction with the nozzles 46 which directs a flame to the desired location on the work.

The support bar 45 also supports one or more conduits 51 for conveying water to nozzles 52, such nozzles being located on either side of the handle at an upper location thereof so that when the water is caused to flow, the nozzles may cause water to trickle down the knife and cool the same.

The gas conduits 49 are controlled by individual adjustment valves 53, (see Fig. 1), while both conduits lead from a common conduit 54 which is controlled by a solenoid valve 55 in an electric circuit for suitable operation, and this conduit 54 is connected to the main conduit 56. The air conduits are likewise controlled by manually-adjusted valves 57 and extend from common conduit 58 controlled by solenoid valve 59 coming from a common supply 60. The water conduit 51 is controlled by a solenoid valve 61 coming from some common source of supply 62.

A timing unit designated generally 65 is provided with a dial 66 and arms 67 and 68 to be set for determining the time of closure of a circuit which will control the solenoid valves. The operation of the timing unit is by means of a push button control 69 having buttons 70, 71. In operation, the push button 70 is pressed, which in time causes the gas flame to heat the work to be soldered. After the soldering operation is completed, the flame is reduced to a mere pilot light which will be arranged for by reason of the setting of the valves. The operator will push the button 71, and the water will be applied to the work to cool the same. Thereafter, the operator will open the jig by means of the handle 44, remove the soldered blade and handle and place in the jig another handle and blade for repeating the operation. The blade 18 has a pin 18' to be received in the hollow handle 25, together with a piece of solder 95 which is placed in the jig for the soldering operation. A series of units may be arranged along the table to be successively operated by an attendant.

In some instances, the timing device will be so arranged that upon completion of the flame-applying time, when this shuts off, water will be caused to be applied to the work for cooling the same, all automatically and without the need of pressing a second button 71. This is a mere mechanical operation which may be readily arranged in the timing device which is heretofore described.

I claim:

1. A knife soldering jig for holding the two component parts of a knife to be soldered in assembled relation, comprising a fixed support having two spaced portions to engage one side of each of the two component parts and the end of one of them, a member hinged to said support and provided with portions to engage the other side of each of the two component parts at a location between the two spaced engaging portions to clamp each of the parts against lateral movement, a second member hinged to said support to engage the end of the other of the component parts of the knife and force the parts longitudinally together, and means to releasably clamp said members together and in engagement with the knife parts to be soldered.

2. A knife soldering jig for holding the two component parts of a knife to be soldered in assembled relation, comprising a fixed support having two spaced portions to engage one side of each of the two component parts and the end of one of them, a member hinged to said support and provided with portions to engage the other side of each of the two component parts at a location between the two spaced engaging portions to clamp each of the parts against lateral movement, a second member hinged to said support to engage the end of the other of the component parts of the knife and force the parts longitudinally together, and resilient means to releasably clamp said members together and in engagement with the knife parts to be soldered, said resilient means urging the first said member into engaging position.

ROBERT C. MARCEAU.